US008936168B2

(12) United States Patent
Wüst et al.

(10) Patent No.: US 8,936,168 B2
(45) Date of Patent: Jan. 20, 2015

(54) ELEMENT, PREFERABLY A CLOSING ELEMENT

(75) Inventors: Beat Wüst, Zürich (CH); Jürg Krauer, Uster (CH)

(73) Assignee: KVT-Koenig AG, Dietikon (CH)

( * ) Notice: Subject to any disclaimer, the term of this patent is extended or adjusted under 35 U.S.C. 154(b) by 0 days.

(21) Appl. No.: 13/882,437

(22) PCT Filed: Nov. 3, 2010

(86) PCT No.: PCT/EP2010/006692
§ 371 (c)(1),
(2), (4) Date: Jul. 24, 2013

(87) PCT Pub. No.: WO2012/059116
PCT Pub. Date: May 10, 2012

(65) Prior Publication Data
US 2013/0327769 A1    Dec. 12, 2013

(51) Int. Cl.
*B65D 53/00* (2006.01)
*F16L 55/132* (2006.01)
*F16B 13/00* (2006.01)

(52) U.S. Cl.
CPC .............. *B65D 53/00* (2013.01); *F16L 55/132* (2013.01); *F16B 13/00* (2013.01)
USPC ...... 220/203.13; 220/212; 215/364; 215/358; 215/228

(58) Field of Classification Search
CPC ........... B65D 39/0052; B65D 51/1611; B65D 51/1605; B65D 51/16; B65D 51/1644; B65D 51/1633; B65D 39/12; B65D 39/04; B65D 2543/0049; B65D 43/022; B65D 43/0214
USPC .................. 220/203.13, 203.11, 203.01, 212; 220/367.1, 792, 789, 804, 801; 215/311, 215/307, 228, 358, 364, 355; 138/93, 89
See application file for complete search history.

(56) References Cited

U.S. PATENT DOCUMENTS 54,201 A * 4/1866 Pike ............................. 215/354
1,914,409 A   6/1933 Draper
(Continued)

FOREIGN PATENT DOCUMENTS

EP     2023031 A1    2/2009
WO  2009000317 A1   12/2008

OTHER PUBLICATIONS

Translation of EP 2023031 (Kainzmeier), Feb. 11, 2009, Paragraph 7.*

(Continued)

*Primary Examiner* — Robert J Hicks
(74) *Attorney, Agent, or Firm* — Brian Roffe

(57) ABSTRACT

Closing element for sealing holes subjected to internal pressure includes a hollow cylindrical main body insertable into the hole substantially without play, and a hat-like spreading element pressable into the main body. The spreading element applies radial pressure to the inner wall of the main body in the installed state, wherein the main body is spread and pressed against the wall of the hole. The main body has a closing bottom having a circumferential radial ring surface and a slightly conical cone surface connected thereto. During operation, the closing bottom is pressed against the end face of the spreading element by the internal pressure and is bent over inner and outer edges of the end face and deformed so as to expand radially. This results in strengthened anchoring of the closure in the material of the component, and self-reinforcement of the press-out force required to remove the closure.

20 Claims, 2 Drawing Sheets

(56) References Cited

U.S. PATENT DOCUMENTS

| | | | |
|---|---|---|---|
| 2,046,609 A * | 7/1936 | Clark | 53/467 |
| 2,446,661 A * | 8/1948 | Murdock | 215/303 |
| 2,705,573 A * | 4/1955 | Zepelovitch | 215/361 |
| 3,560,030 A | 2/1971 | Macks et al. | |
| 3,809,273 A * | 5/1974 | Lehr | 215/202 |
| 5,078,294 A | 1/1992 | Staubli | |
| 5,275,299 A * | 1/1994 | Konrad et al. | 215/341 |
| 5,494,170 A * | 2/1996 | Burns | 215/247 |
| 5,699,923 A * | 12/1997 | Burns | 215/247 |
| 5,944,057 A | 8/1999 | Pierce | |

OTHER PUBLICATIONS

Translation of WO 2009/000317 (Hollinger), Dec. 31, 2008, pp. 1-3.*

* cited by examiner

ELEMENT, PREFERABLY A CLOSING ELEMENT

FIELD OF THE INVENTION

The invention relates to an element, preferably a closing element for sealing holes of engine and valve blocks, chemical containers and similar components subjected to internal pressure, comprising a hollow cylindrical main body that can be inserted into the hole substantially without play, and a spreading element that can be pressed into the main body, said spreading element applying radial pressure to the inner wall of the main body in the installed state.

BACKGROUND OF THE INVENTION

In particular, closing elements of this type are used as so-called expanders in holes with different diameters and internal pressures. Different embodiments are produced depending on the size of the hole and the strength of the effective internal pressure. A closing element of the type specified at the start is disclosed in WO 2009/000317 A1. The closure described here is characterised by simple production and equally simple operation, but at the same time has the disadvantage that it can only be used with small to moderate internal pressures. With higher internal pressures the secure anchoring of the closure to the wall of the hole to be closed is not always guaranteed.

OBJECTS AND SUMMARY OF THE INVENTION

The object underlying the invention is to avoid this disadvantage and to create an element of the type specified at the start that is characterised in that, with simple production and operation, it can also withstand substantially higher internal pressures.

According to the invention, this object is achieved in that the main body is provided with a closing bottom, the installation depths of the main body and of the spreading element being matched to one another such that in the installed state the side wall of the main body is pressed approximately radially against the wall of the hole to be closed by an axial force acting on the closing bottom in cooperation with the spreading element.

The bending moment and deformation of the closing bottom resulting from this brings about an additional lateral pressing force or widening of the main body which, on its part, results in reinforced anchoring of the expander in the wall of the component that has the hole. The closing element can thus withstand substantially higher internal pressures without becoming detached from the hole.

Furthermore, the invention makes provision such that the closing bottom can be bent by the axial force at the inner or outer edge of the main body on the inside face of the spreading element. This produces spatially defined spreading of the main body which causes particularly strong anchoring of the same in the wall of the component.

Within the framework of the sought after deformation of the main body it is advantageous if its wall thickness is less than that of the spreading element. However, materials of the main body and of the spreading element can also be chosen such that this deformation of the main body takes place correspondingly.

With regard to the mass production of the closure according to the invention it is advantageous if the main body and the spreading element are produced as sheet metal parts.

Furthermore, the invention makes provision such that the main body is provided with a supporting flange projecting on the outside by means of which the installation depth of the main body can be established in co-operation with a contact surface of the component.

Moreover, the invention makes provision such that the main body is provided on the input side with a cylindrical inner ledge for easy introduction of the spreading element into the main body.

In order to reinforce the anchoring of the main body to the wall of the component, circumferential grooves can preferably be assigned to the outer surface of the main body.

The invention also makes provision such that the outer surface of the spreading element is slightly conical with a diameter that decreases from the inside to the outside.

BRIEF DESCRIPTION OF THE DRAWINGS

In the following the invention is described in more detail by means of an exemplary embodiment with reference to the drawings. These show as follows.

DETAILED DESCRIPTION OF THE INVENTION

Figure 1:
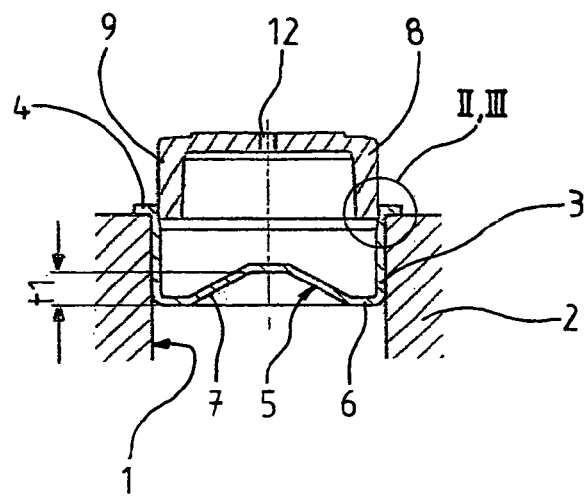
FIG. 1 is a closure according to the invention, shown in cross-section.

The closure according to FIG. 1 to FIG. 7 serves to seal a hole 1 of a component 2, for example an engine block produced as a cast part. The hole generally has a diameter of between 15 and 60 mm and is subjected to a standard operating pressure of between 5 and 100 bar. Therefore, the closure can also be used in holes with different diameters and operating pressures.

The closing element has a hollow cylindrical main body 3 that can be inserted into the hole 1 substantially without play, said main body 3 being provided with a supporting flange 4 projecting to the outside and an inwardly curved closing bottom 5. The latter has a circumferential radial ring surface 6 to which a slightly conical cone surface 7 is connected. Instead of a supporting flange 4 in the main body 3, a graduated external diameter or a lower contact surface, for example, could also be provided in the hole 1.

The closing element further comprises a hat-like spreading element 8 that can be pressed into the main body 3, the outer surface 9 of said spreading element 8 being cylindrical in form, but possibly also being provided with a slight conicity, advantageously with a larger diameter at the bottom at the opening.

Figure 2:
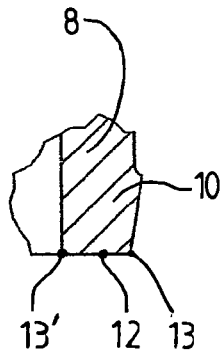
FIG. 2 is a detail of the main body according to detail II/III in FIG. 1.
Figure 3:
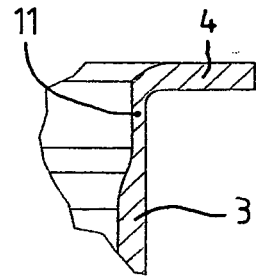
FIG. 3 is a detail of the spreading element, likewise according to detail II/III in FIG. 1.
Figure 4:
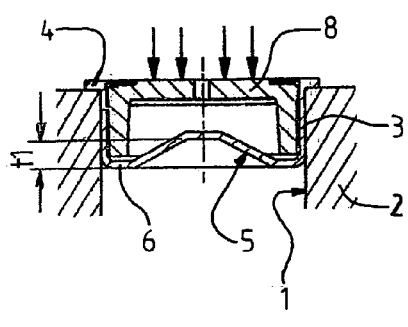
FIG. 4 is a section of the closure according to FIG. 1 shown in the installed state.

Advantageously, the spreading element 8 is already pushed slightly into the main body 3 in a pre-assembly so that the two parts are fitted together. As can be seen from FIG. 1, the main body 3 is inserted into the hole 1 substantially without play until the supporting flange 4 is in contact with the component 2. The installation depth of the main body results from this. After this the spreading element 8 is introduced into the main body 3, the latter being provided on the input side with a cylindrical inner ledge 11 which facilitates the introduction of the spreading element. The spreading element 8 is then pushed into the main body 3 with the aid of a press, a hammer or a pressure gun until, as can be seen in FIG. 4, its lower face 12 rests on the ring surface 6 of the closing bottom 5 or is only slightly offset from the latter. In this installation position the upper face of the spreading element 8 is flush with the supporting flange 4 of the main body. In order to establish the installation depth of the spreading element the latter can also be provided with a supporting flange. Furthermore, as shown in FIG. 2, an outer ledge 10 can be provided in the spreading element 8.

When the spreading element 8 is pressed into the main body, the latter is widened by the spreading element 8 and is pressed radially against the wall of the hole to be closed. In this way the main body 3 is anchored securely in the wall of the component and so is capable of withstanding the internal pressure prevailing during operation without said pressure detaching it from the hole. The input-side outer ledge 10 of the spreading element 8, with which the widening of the main body 3 is brought about, also contributes to this. In order to reinforce the anchoring of the main body, its outer and/or inner surface can preferably be provided with circumferential grooves.

There is also provided in the spreading element 8 a ventilation hole 19 which prevents excess pressure from being able to build up in the space between the spreading element and the closing bottom 5 of the main body. It is unnecessary in many cases with appropriate working conditions.

The main body 3 and the spreading element 8 are produced as moulded parts produced by the deep drawing method or by machining. As can be seen in particular from FIG. 6, the wall thickness of the main body 3 has smaller dimensions than those of the spreading element 8. Both wall thicknesses are allocated such that the spreading element 8 in the installed state remains substantially non-deformed, whereas the main body 3 is spread by the effect of the spreading element 8.

Figure 6:
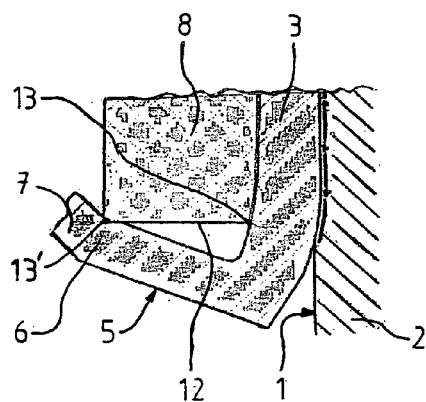
FIG. 6 is detail VI from FIG. 5.

As can be seen from FIG. 6, during operation the closing bottom 5 of the main body 3 is bent, at least on the annular outer edge 13 of the spreading element 8, by the prevailing internal pressure and the axial force thus produced. Advantageously, before this bending the lower face 12 is provided a distance away from the ring surface 6 of the closing bottom 5. The width of the ring surface 6 can be allocated such that the closing bottom 5 is bent by the pressure to which it is subjected over this outer edge 13 of the spreading element 8. The extent of deformation corresponds to the difference between the distances t1 and t2. An additional widening of the main body and consequently reinforced anchoring of the closure is thus produced in the component.

However, bending on the inner edge 13' could also take place additionally or instead on the outer edge 13 of the lower face 12 of the main body 8. In principle, the lower face 12 could be formed almost in a point so that there is only one annular edge.

In order to detach the closure from the hole 1, a substantially higher press-out pressure is required than with comparable conventional closures. The closure according to the invention brings about self-reinforcement of the required press-out force here. A pre-requisite for this, however, is sufficiently great initial anchoring.

In order to facilitate spreading of the main body 3 within the hole 1, within the framework of the invention it is possible to provide longitudinally extending recesses, slots or windows in the cylindrical side wall of the main body. For the purpose of better anchoring the outer wall of the main body can be provided with a friction-increasing coating.

The main body and the spreading element are preferably produced from a metal provided with or without a coating, such as for example stainless steel or aluminium. However, they can also be produced, for example, from plastic, in particular glass fibre-reinforced plastic. Theoretically, said main body and spreading element could also deviate from a hollow cylindrical cross-sectional shape, for example they could have an approximately square, rectangular or similar shape.

The spreading element 8 formed like a hat could also be provided on its cylindrical part with longitudinal slots so that it would be somewhat more flexible in the radial direction.

Figure 5:
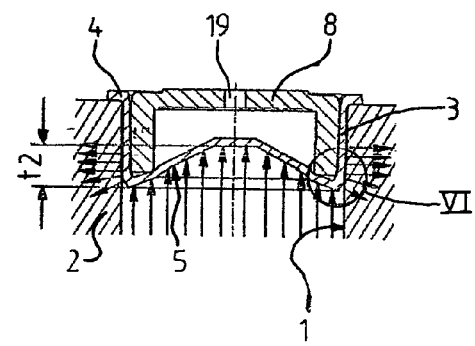
FIG. 5 is the closure from FIG. 1, illustrated when subjected to internal pressure.
Figure 7:
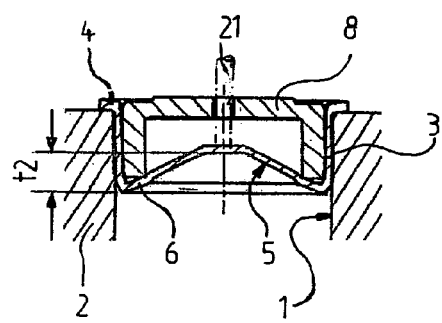
FIG. 7 is the closure according to FIG. 1 in section, with the closing bottom deformed by the internal pressure.

In principle the element can also be in the form of a holding element and this axial force acting on the closing bottom 5 of the main body 3 can take place here by means of an associated axis 21 or the like, as indicated with a dashed line in FIG. 7, by this axis fastened to the closing bottom 5 and extending through this ventilation hole 19 (see FIG. 5). This axis 21 can then on its part be connected to an object fastened to it. For example, the hole could be arranged in a ceiling and the axis could project downwards and a lamp or the like could be fastened to it.

The closing bottom of the main body could also be level in form or be curved against the inside of the component.

The invention claimed is:

1. A closing element for sealing a hole of a component subjected to internal pressure, comprising:
   a main body insertable into the hole substantially without play, said main body including a side wall and a closing bottom portion, and
   a spreading element pressable in an axial direction into said main body,
   said main body and said spreading element being configured to cause said side wall of said main body to be pressed radially outward when said spreading element is axially pressed into said main body and against said bottom portion,
   whereby the radially outward pressing of said side wall of said main body upon axial pressing of said spreading element against said bottom portion causes, when the closing element is inserted in the hole, said side wall to press against a wall defining the hole to thereby close the hole,
   a face of said spreading element that is pressed at at least one edge into contact with said bottom portion having an inner edge and an outer edge,
   said bottom portion being configured such that contact between at least one of said inner and outer edges and said bottom portion upon axially pressing of said spreading element into said main body causes said side wall of said main body to be pressed radially outward.

2. The element according to claim 1, wherein said main body and said spreading element are configured such that a height of said side wall of said main body and a height of said spreading element are matched to one another to thereby cause said side wall of said main body to be pressed radially outward when said spreading element is axially pressed into said main body.

3. The element according to claim 1, wherein said main body defines an installation depth for said spreading element that is matched to an installation depth of said spreading element in said main body to thereby cause said side wall of said main body to be pressed radially outward when said spreading element is axially pressed into said main body.

4. The element according to claim 1, wherein said bottom portion is configured such that contact between said inner edge and said bottom portion upon axially pressing of said spreading element into said main body causes said side wall of said main body to be pressed radially outward.

5. The element according to claim 1, wherein said bottom portion is configured such that contact between said outer edge and said bottom portion upon axially pressing of said spreading element into said main body causes said side wall of said main body to be pressed radially outward.

6. The element according to claim 1, wherein said bottom portion is configured such that contact between both said inner and outer edges and said bottom portion upon axially pressing of said spreading element into said main body causes said side wall of said main body to be pressed radially outward.

7. The element according to claim 1, wherein said face is not fully pressed into contact with said bottom portion.

8. The element according to claim 7, wherein said bottom portion includes a circumferential radial ring surface and a conical surface connected to said radial ring surface, said radial ring surface having a width dimensioned such that said bottom portion is bent and widens radially by pressure provided by axially pressing of at least one of said inner and outer edges of said face of said spreading element against an inner edge region of said radial ring surface of said bottom portion.

9. The element according to claim 1, wherein said side wall of said main body is cylindrical and said bottom portion is inwardly curved.

10. The element according to claim 1, wherein said spreading element has a side wall having a surface that partly contacts said bottom portion of said main body upon axially pressing of said spreading element into said main body, and an upper wall opposite said bottom portion of said main body.

11. The element according to claim 1, wherein said main body and said spreading element are sheet metal parts.

12. The element according to claim 1, wherein said main body further comprises an outwardly projecting support flange arranged at an end of said side wall opposite an end at which said bottom portion is coupled to said side wall.

13. The element according to claim 1, wherein said main body further comprises a cylindrical inner ledge arranged at an end of said side wall opposite an end at which said bottom portion is coupled to said side wall, said inner ledge being configured to ease introduction of said spreading element into said main body.

14. The element according to claim 1, wherein said side wall of said main body includes an outer surface and an inner surface, and circumferential grooves arranged in at least one of said outer and inner surfaces.

15. The element according to claim 1, wherein said side wall of said main body includes an outer surface and an inner surface, and a friction-increasing coating arranged on at least one of said outer and inner surfaces.

16. The element according to claim 1, wherein said spreading element includes an outer ledge on a side facing said side wall of said main body.

17. The element according to claim 1, wherein said spreading element is configured to hold an object about an axis defined by said spreading element.

18. The element according to claim 1, wherein at least one of said main body and said spreading element are made of a metal provided with or without a coating.

19. The element according to claim 1, wherein at least one of said main body and said spreading element are made of plastic.

20. The element according to claim 1, wherein said side wall is cylindrical and is connected at a bottom, axial edge to said bottom portion, said bottom portion having an outer radial edge and extending inwardly of said bottom edge of said side wall to thereby provide said main body with a hollow cylindrical interior that is closed at its bottom by said bottom portion.

\* \* \* \* \*